US008122337B2

(12) United States Patent  
MacGregor et al.

(10) Patent No.: US 8,122,337 B2
(45) Date of Patent: Feb. 21, 2012

(54) APPARATUS AND METHOD FOR NAVIGATING A MULTI-DIMENSIONAL DATABASE

(75) Inventors: John Malcolm MacGregor, Berkshire (GB); Ian Thomas McAlpine, North Vancouver (CA); Donald Alastair MacCormick, London (GB)

(73) Assignee: SAP France S.A., Paris (FR)

( * ) Notice: Subject to any disclaimer, the term of this patent is extended or adjusted under 35 U.S.C. 154(b) by 876 days.

(21) Appl. No.: 12/147,412

(22) Filed: Jun. 26, 2008

(65) Prior Publication Data

US 2009/0327852 A1 Dec. 31, 2009

(51) Int. Cl.
*G06F 17/00* (2006.01)
(52) U.S. Cl. .......................... 715/214; 715/227; 707/603
(58) Field of Classification Search .................. None
See application file for complete search history.

(56) References Cited

U.S. PATENT DOCUMENTS

| 5,623,282 | A  | * | 4/1997 | Graham et al. | 345/672 |
| 6,225,996 | B1 | * | 5/2001 | Gibb et al. | 715/784 |
| 6,579,324 | B1 | * | 6/2003 | Lowry et al. | 715/243 |
| 6,801,910 | B1 | * | 10/2004 | Bedell et al. | 1/1 |
| 2004/0230585 | A1 | * | 11/2004 | Middelfart | 707/100 |
| 2005/0210389 | A1 | * | 9/2005 | Middelfart | 715/730 |
| 2005/0283488 | A1 | * | 12/2005 | Colossi et al. | 707/100 |
| 2006/0020608 | A1 | * | 1/2006 | D'Hers et al. | 707/100 |
| 2007/0157074 | A1 | * | 7/2007 | Breedvelt-Schouten et al. | 715/503 |
| 2007/0174262 | A1 | * | 7/2007 | Middelfart | 707/4 |
| 2008/0307357 | A1 | * | 12/2008 | Gould et al. | 715/810 |
| 2009/0119309 | A1 | * | 5/2009 | Gibson et al. | 707/100 |
| 2009/0248715 | A1 | * | 10/2009 | Bernhardt et al. | 707/100 |
| 2011/0258167 | A1 | * | 10/2011 | Binstock et al. | 707/690 |

* cited by examiner

*Primary Examiner* — Stephen Hong
*Assistant Examiner* — Asher Kells
(74) *Attorney, Agent, or Firm* — Mintz, Levin, Cohn, Ferris, Glovsky & Popeo, P.C.

(57) ABSTRACT

A computer readable storage medium comprises executable instructions to provide a Graphical User Interface for displaying visualizations of a multi-dimensional database. An action is received within a visualization of a table of the multi-dimensional database, the action performed by a user when selecting a cell of the table. A slice in the visualization is populated in response to the action. The visualization is filtered to drill down on dimensions associated with the cell.

11 Claims, 8 Drawing Sheets 905
800
915
910
900

| | Internet | Reseller |
|---|---|---|
| Australia | $13,277.12 | $4.12 |
| Canada | $7,184.14 | $4,465.54 |
| Central | $21.49 | $768.68 |
| France | $5,792.10 | |
| Germany | $5,372.24 | $3,027.34 |
| NA | | |
| Northeast | $34.99 | $1,711.33 |
| Northwest | $8,344.18 | $2,803.21 |
| Southeast | $47.58 | $587.77 |
| Southwest | $12,036.83 | $1,835.31 |
| United Kingdom | $5,895.23 | $781.97 |

Crosstab 1 — Measures: Sales Amount
Product Categories.Accessories
Sales Territory, Sales Channel
Date.Calendar.February 2004

FIG. 9

APPARATUS AND METHOD FOR NAVIGATING A MULTI-DIMENSIONAL DATABASE

FIELD OF THE INVENTION

This invention relates generally to accessing data in a multi-dimensional database. More particularly, this invention relates to techniques for graphically navigating a multi-dimensional database to provide fast and easy access to data in the database.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

OLAP data sources and tools are a subset of BI tools. There are a number of commercially available OLAP tools, such as, for example, Business Objects Voyager™, available from Business Objects™, an SAP® company, of San Jose, Calif. OLAP tools are report generation tools and are otherwise suited to ad hoc analyses. OLAP generally refers to a technique of providing fast analysis of shared multi-dimensional information stored in a database. OLAP systems provide a multi-dimensional conceptual view of data, including full support for hierarchies and multiple hierarchies. This framework is used because it is a logical way to analyze businesses and organizations. In some OLAP tools, the data is arranged in a schema which simulates a multi-dimensional schema. The multi-dimensional schema means redundant information is stored, but it allows for users to initiate queries without the need to know how the data is organized.

OLAP is typically implemented in a multi-user client/server mode to offer consistently rapid responses to queries, regardless of database size and complexity. OLAP helps the user synthesize information through use of an OLAP server that is specifically designed to support and operate on multi-dimensional data sources. The design of the OLAP server and the structure of the data are optimized for rapid ad hoc information retrieval in any orientation, as well as for fast, flexible calculation and transformation of raw data members on formulaic relationships.

There are also known techniques for graphically portraying quantitative information. The techniques are used in the fields of statistical graphics, data visualization, and the like. A visualization is a graphic display of quantitative information produced from data in a data source (e.g., an OLAP cube, relational database). Types of visualizations include charts, tables, and maps. Visualizations can reveal insights into the relationships between data.

Commercially available tools for visualizing data include, for example, Crystal Xcelsius™, Star Tree®, Business Objects Web Intelligence®, BusinessObjects Performance Manager™, BusinessObjects Voyager™, BusinessObjects XI™, and BusinessObjects Dashboard Builder™, available from Business Objects™, an SAP® company, of San Jose, Calif. These tools include various frameworks for visualizing data, such as performance dashboards and scorecards, and allow users to see their data in multiple forms, sometimes simultaneously in a single display screen.

The data within an OLAP cube may include categorical dimensions, numerical measure dimensions, and time dimensions. A categorical dimension is a data element that categorizes each item in a data set into non-overlapping regions. A numerical measure dimension or measure includes data defined by a computation, such as a sum or average. For example, an OLAP cube of a retail store might have categorical dimensions such as Products, Customers, Suppliers, and Promotions and numerical measures such as Revenue and Profit margin. The time dimension comprises data grouped in accordance with a time metric. For example, time dimensions may include Quarter 1, Quarter 2, Quarter 3, and Quarter 4.

Multi-dimensional databases undertake to provide fast navigation and informative presentation of data inside an OLAP cube. Summary data is provided in table cells, and each cell is addressed by a set of dimensions and measures. For example, a cell addressed by (Products, Revenue, Quarter 1) would contain summary data for product revenue during the first quarter. The summary data may be in the form of a single aggregated value for the specified dimensions and measures.

Existing multi-dimensional databases, however, have limitations with regards to their ability to deliver these results. Existing multi-dimensional databases are user driven, giving little direction into effective navigation of the data therein. The problem has been further aggravated as the data volumes within OLAP cubes increases making data navigation even more complex.

A user must be able to navigate within an OLAP cube to solve business problems. For example, a user must be able to "drill-down" from one table to another to acquire more details on a specific data object. Conversely, a user must also be able to "drill-up" from one table to another to reduce the level of detail regarding the object. In doing so, it would be advantageous to insulate the user from the complexities of the underlying data sources.

Traditional methods of navigation in multi-dimensional databases include dragging dimensions of interest onto a table or crosstab and then drilling down the member hierarchies of the selected dimensions shown in the table. The user must select the member hierarchies to be drilled down, a process that can be cumbersome, inefficient and time consuming.

Accordingly, it would be desirable to provide techniques for graphically navigating a multi-dimensional database to provide fast and easy access to data in the database. In particular, it would be highly desirable to provide techniques to automatically filter a visualization to drill down on dimensions associated with a table cell selected by a user.

SUMMARY OF THE INVENTION

The invention includes a computer readable storage medium with executable instructions to provide a Graphical User Interface for displaying visualizations of a multi-dimensional database. An action is received within a visualization of a table of the multi-dimensional database, the action performed by a user when selecting a cell of the table. A slice in the visualization is populated in response to the action. The visualization is filtered to drill down on dimensions associated with the cell.

The invention also includes a computer readable storage medium with executable instructions to provide a visualization of a multi-dimensional database, the visualization displaying a crosstab having a first dimension across the crosstab and a second dimension down the crosstab. A slice in the visualization is populated with a member of the first dimension and a member of the second dimension in response to a user selection of a cell in the crosstab. The visualization is filtered based on the member of the first dimension and the member of the second dimension.

The invention further includes a method for navigating through a multi-dimensional database. A visualization of a multi-dimensional database is provided, the visualization displaying a crosstab having a first dimension across the crosstab and a second dimension down the crosstab. The crosstab is updated to display dimensions associated with a member of the first dimension and a member of the second dimension, the member of the first dimension and the member of the second dimension represented in a cell of the crosstab selected by a user.

BRIEF DESCRIPTION OF THE DRAWINGS

The invention is more fully appreciated in connection with the following detailed description taken in conjunction with the accompanying drawings, in which like reference characters refer to like parts throughout, and in which:

FIG. 9 illustrates the filtered visualization shown in FIG. 8B with an action performed by a user in accordance with an embodiment of the invention.

DETAILED DESCRIPTION OF THE INVENTION

The present invention provides a system, method, software arrangement, and computer readable storage medium for navigating through a multi-dimensional database. A multi-dimensional database, as generally used herein, refers to any database providing a multi-dimensional conceptual view of data, including full support for hierarchies and multiple hierarchies. A multi-dimensional database may be, for example, an OLAP cube.

As described above and appreciated by one of ordinary skill in the art, data in an OLAP cube may be visualized in a table or crosstab. A crosstab is a visualization of data that displays a joint distribution of two or more variables simultaneously. Crosstabs are usually presented in a matrix format with cells. Each cell shows a value associated with a specific combination of row and column headings.

For example, the crosstab shown in Table I below contains cells representing the revenues for the USA and international regions covered by a given organization during 2007 and 2008. Table I displays the dimension "Year" across the table and the dimension "Region" down the table.

TABLE I

Exemplary OLAP Crosstab

| Region | Year | |
|---|---|---|
| | 2007 | 2008 |
| USA | $5.7 (M) | $8.3 (M) |
| International | $2.3 (M) | $6.2 (M) |

According to an embodiment of the invention, a user may select a cell in a table of a multi-dimensional database and automatically update the table to drill down on dimensions associated with the cell. The dimensions associated with the cell are displayed as a slice in the visualization. The visualization is then filtered or updated to display new dimensions that are automatically determined according to a variety of criteria, as described in more detail herein below.

For example, consider Table I above. A user may select the cell representing revenues for the USA region in 2008. Selecting the cell may automatically filter the visualization to display the new dimensions of States and Product Lines. Each cell in the filtered visualization would represent the 2008 revenues in each state for each product line. The user can continue navigating the data until all dimensions have a member selected. Such navigation may be referred to as "Pin & Pivot," to reflect the selection of a cell ("Pin") and the filtering or reorientation of the table ("Pivot"). Pin & Pivot navigation enables a user to very quickly focus into the details of a multi-dimensional database.

Figure 1:
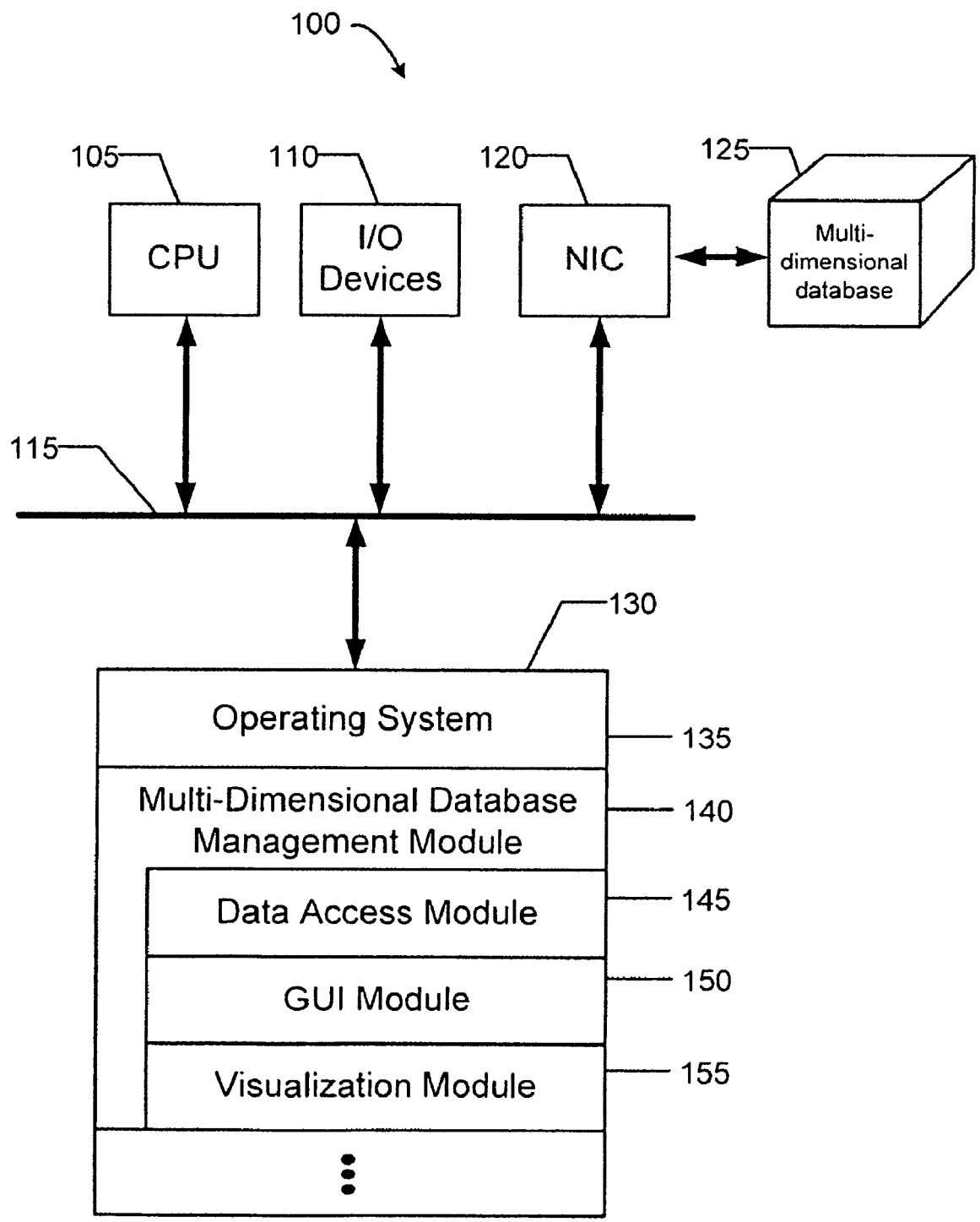
FIG. 1 illustrates a computer constructed in accordance with an embodiment of the invention.

FIG. 1 illustrates a computer in accordance with an embodiment of the invention. Computer 100 includes standard components, including a Central Processing Unit ("CPU") 105 and input/output devices 110, which are linked by a bus 115. Input/output devices 110 may include a keyboard, mouse, display screen, monitor, printer, and the like. Network Interface Circuit ("NIC") 120 may also be connected to the bus 115. NIC 120 provides connectivity to a wired or a wireless network (not shown), thereby allowing computer 100 to operate in a networked environment. For example, networked data sources 125 are connected to computer 100 through NIC 120. In accordance with an embodiment of the invention, networked data sources 125 may include a multi-dimensional database, such as an OLAP cube.

Memory 130 is also connected to the bus 115. In one exemplary embodiment, memory 130 stores one or more of the following modules: an Operating System module 135 and a Multi-Dimensional Database Management module 140. Operating System module 135 may include instructions for handling various system services, such as file services or for performing hardware dependant tasks. Multi-Dimensional Database Management module 140 may include executable instructions for managing and maintaining a multi-dimensional database, including supporting a Graphical User Interface ("GUI") and providing visualizations of data in the multi-dimensional database.

According to an embodiment of the invention, Multi-Dimensional Management module 140 includes a Data Access module 145, a GUI module 150, and a Visualization module 155. Data Access module 145 may include executable instructions to process user queries for access to data stored in multi-dimensional database 125. GUI module 150 may rely upon standard techniques to produce graphical components of a user interface, e.g., windows, icons, buttons, menu and the like, for accessing and managing multi-dimensional database 125. For example, in one embodiment, a user of multi-dimensional database 125 may employ the GUI to select a plurality of dimensions and measures for display. The GUI may also be used to query the multi-dimensional database 125 and to display results of the query to users.

In accordance with an embodiment of the invention, Visualization module 155 may include executable instructions for creating visualizations in a display screen, such as tables or crosstabs displaying summary data for multiple dimensions, and for receiving actions performed on the visualizations. With Visualization module 155, users may select a cell in a crosstab and automatically filter the crosstab to drill down on dimensions associated with the cell. The dimensions associated with the cell may be displayed, for example, on a slice atop the crosstab. The crosstab is then filtered or updated to display new dimensions that are automatically determined according to a variety of criteria, as described in more detail herein below.

Visualization module 155 may also work in conjunction with GUI module 150 to display a GUI to users for creating and displaying visualizations in a display screen. For example, Visualization module 155 may display drop-down menus, textboxes, window widgets, pop-up windows, and other GUI components to enable users to select dimensions to be displayed in a crosstab, highlight or draw attention to cells in the crosstab, view information associated with a given crosstab, and so on.

It is appreciated that the executable modules stored in memory 130 are exemplary. It is also appreciated that the functions of the modules may be combined. In addition, the functions of the modules need not be performed on a single computer. Instead, the functions may be distributed across a network, if desired.

Indeed, the invention may be commonly implemented in a client-server environment with various components being implemented at the client-side and/or the server-side. For example, one of ordinary skill in the art appreciates that the functions of modules 140-155 may be performed at computer 100 or at a server connected to computer 100. In one exemplary embodiment, some or all of the functions of modules 140-155 may be performed at computer 100. In another exemplary embodiment, some or all of the functions of modules 140-155 may be performed at a server connected to computer 100. As understood by those of ordinary skill in the art, it is the functions of the invention that are significant, not where they are performed or the specific manner in which they are performed.

As also appreciated by one of ordinary skill in the art, multi-dimensional database 125 may be hosted by a content provider, e.g., a Business Intelligence provider, in a web site accessed by multiple users. Accordingly, the functions of modules 140-155 may be performed at a web server hosting the web site. Users of the multi-dimensional database 125 may access the web site to access, manage, and analyze their data stored in multi-dimensional database 125.

Figure 2:
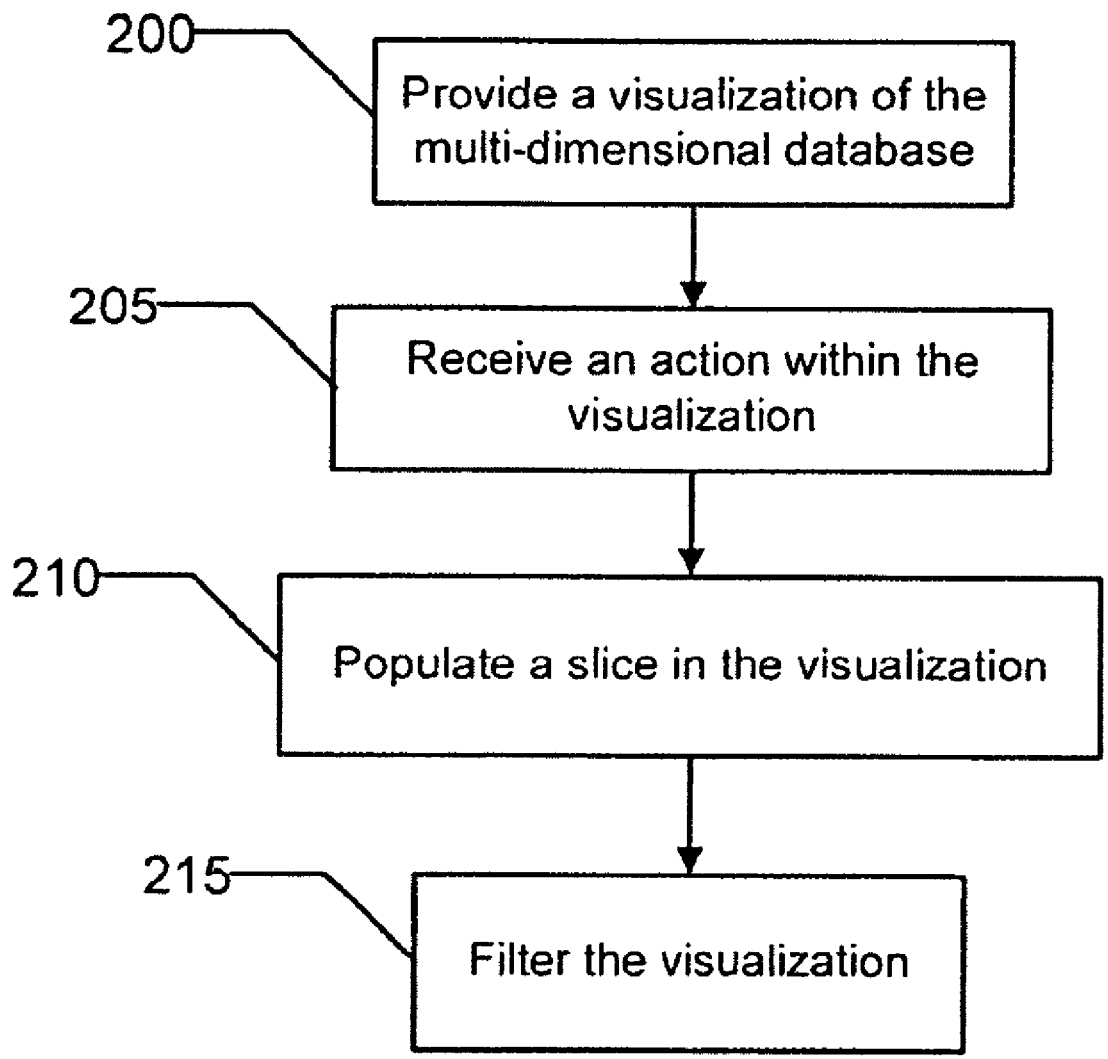
FIG. 2 illustrates a flow chart for navigating through a multi-dimensional database in accordance with an embodiment of the invention.

Referring now to FIG. 2, a flow chart for navigating through a multi-dimensional database in accordance with an embodiment of the invention is described. First, a visualization of the multi-dimensional database is provided (200). The visualization may be, for example, a crosstab displaying members of a first dimension across the crosstab and members of a second dimension down the crosstab, such as the crosstab shown in Table I above. The dimensions displayed in the crosstab may be predetermined or selected by a user.

Next, an action within the visualization is received (205). The action may be, for example, a selection of a cell in the crosstab. The cell may be selected by having a user highlight the cell or bring up a pop-up menu via a right mouse click on the cell. In response to the action, a slice in the crosstab is populated with the dimension members represented in the cell (210). The slice may be, for example, displayed atop the crosstab or in any other location visually desired by the user. One skilled in the art appreciates that the slice is a proposed filter on the content of the crosstab and its underlying query.

Lastly, the visualization is filtered to drill down on dimensions associated with the cell (215). In one embodiment, this is accomplished by automatically determining new dimensions to be displayed in the crosstab. The new dimensions are associated with the dimension members represented in the cell and are determined according to a variety of criteria, as described in more detail herein below.

Figure 3:
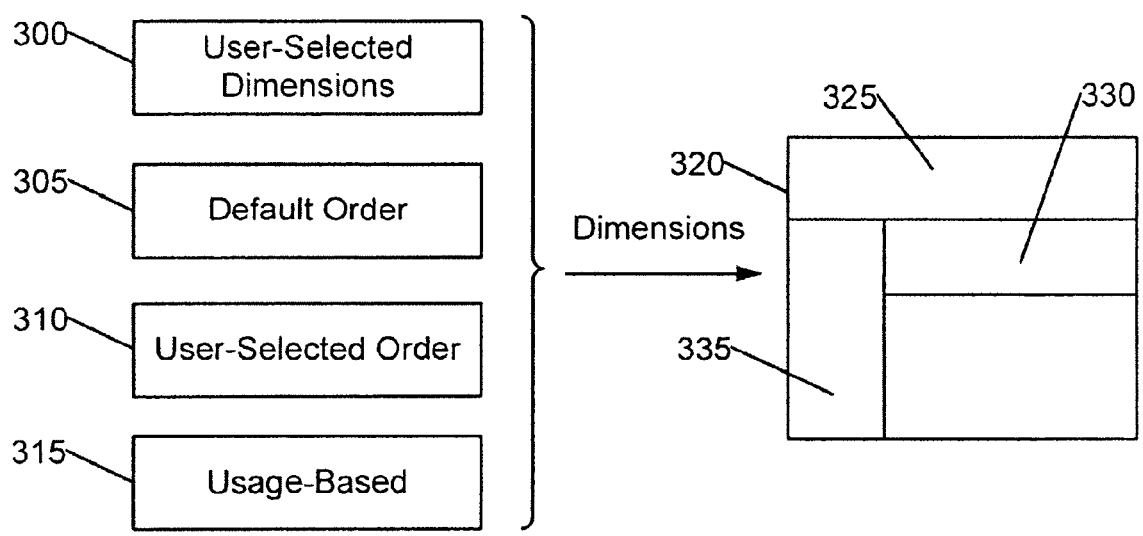
FIG. 3 illustrates a schematic diagram representing criteria for determining dimensions to be displayed in a crosstab in response to a user action selecting a cell in the crosstab in accordance with an embodiment of the invention.

Referring now to FIG. 3, a schematic diagram representing criteria for determining dimensions to be displayed in a crosstab in response to a user action selecting a cell in the crosstab in accordance with an embodiment of the invention is described. The criteria may include, for example, user-selected dimensions 300, default order 305, user-selected order 310, and usage-based order 315. Upon selecting a cell of a crosstab, e.g., crosstab 320, the members represented in the cell may be displayed in slice 325 atop crosstab 320. The dimensions displayed in the crosstab are then filtered to new dimensions selected according to one of criteria 300-315.

For example, the crosstab may be left blank and the new dimensions may be dragged and dropped by a user from a list of available dimensions (300). The new dimensions may also be automatically displayed according to a predetermined order. The order may be a default order (305), a user-selected order (310), or a usage-based order (315). In this latter case, a dimension order can be established by monitoring usage and thus determining the order of the most frequently used dimensions. In one embodiment, the first and second unselected dimensions in die predetermined order are displayed across (330) and down (335) the crosstab 320.

Figures 4, 5:
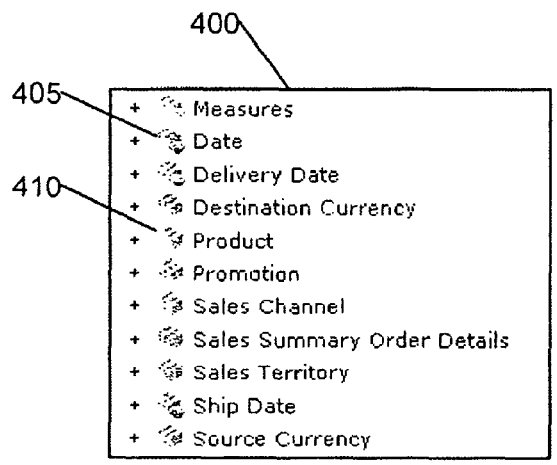
FIG. 4 illustrates exemplary dimensions of an exemplary OLAP cube.
FIG. 5 illustrates a visualization of selected dimensions shown in FIG. 4 in accordance with an embodiment of the invention.

A list of exemplary dimensions is illustrated in FIG. 4. The user may select any two dimensions from list 400 to display in a crosstab. For example, the user may select the dimension Date 405 to display across die crosstab and the dimension Product 410 to display down die crosstab.

A crosstab displaying dimensions 405 and 410 is illustrated in FIG. 5. Crosstab 500 illustrates joint values for members of dimensions 405-410 in multiple cells. For example, dimension Date 405 is shown with members 510-515 representing the months of January, February, and March of 2004, and dimension Product 410 is shown with members 520-535 representing different product categories, such as Accessories 520, Bikes 525, Clothing 530, Components 535, as well as All Products 540.

Each cell in crosstab 500 displays values for a given measure, which may also be selected by die user. For example, the user may select the Sales Amount measure 545. In this case, each cell in crosstab 500 displays die sales amount for a given Date 405 and Product 410. For example, cell 550 displays the sales amount for Components 535 during February of 2004 (510).

According to an embodiment of the invention, a user may select a cell of crosstab 500 for filtering die visualization, that is, for displaying new dimensions in the crosstab for drilling down on the selected cell. The dimension members associated with the selected cell are then displayed on a slice in the crosstab, such as slice 555 in crosstab 500.

Figure 6A:
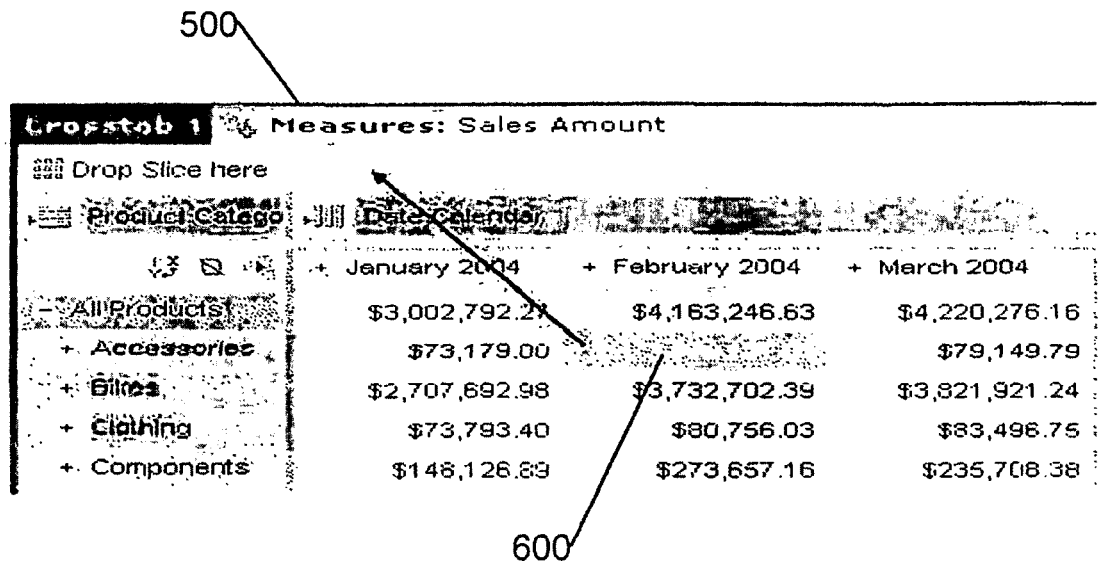
FIG. 6A illustrates an action within the visualization shown in FIG. 5 in accordance with an embodiment of the invention.
Figure 6B:
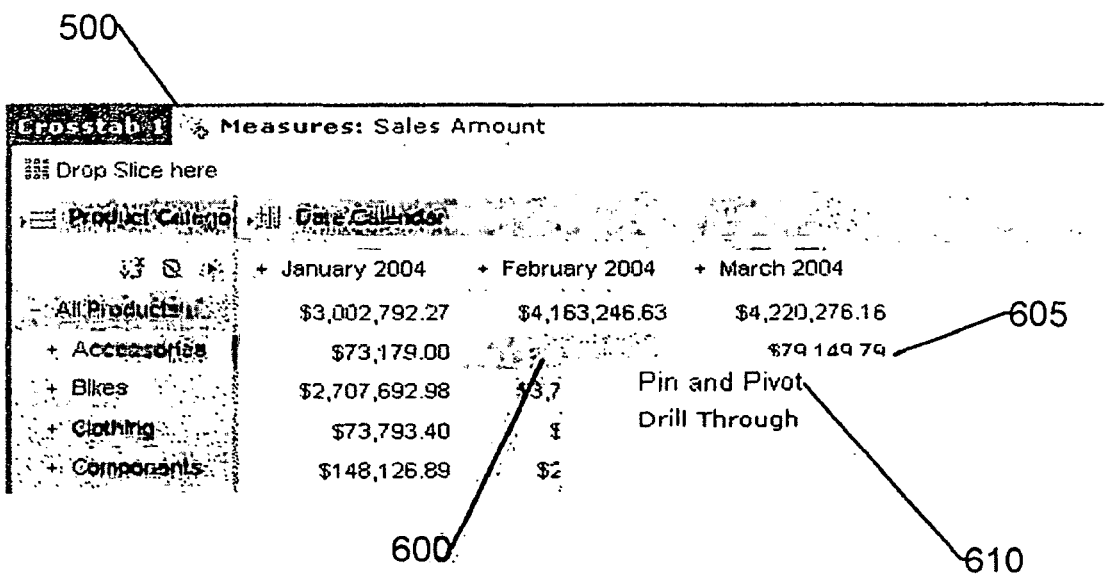
FIG. 6B illustrates another action within the visualization shown in FIG. 5 in accordance with an embodiment of the invention.

Referring now to FIGS. 6A-B, exemplary actions within crosstab 500 for selecting a cell in accordance with an embodiment of the invention are described. The user may select a cell by highlighting the cell, as shown in FIG. 6A, and drag the cell contents and drop on to the slice 555. Alternatively, the user may select a cell and invoke a pop-up menu via a right mouse click, as shown in FIG. 6B. For example, the user may highlight cell 600 associated with dimension members February 2004 (510) and Accessories (520) for display in slice 555. The user may also invoke menu 605 and select the "Pin & Pivot" option 610 to display die dimension members 510 and 520 associated with cell 600 in slice 555.

Figure 7A:
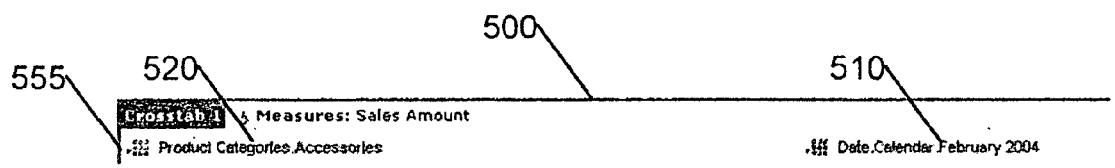
FIG. 7A illustrates a slice in the visualization populated in response to the action of either FIG. 6A or FIG. 6B in accordance with an embodiment of the invention.

As described above, in response to the action performed by the user, slice 555 is populated with the dimension members associated with the selected cell 600. A populated slice 555 is illustrated in FIG. 7A. The dimension members February 2004 (510) and Accessories (520) are prominently displayed in slice 555.

Figure 7B:
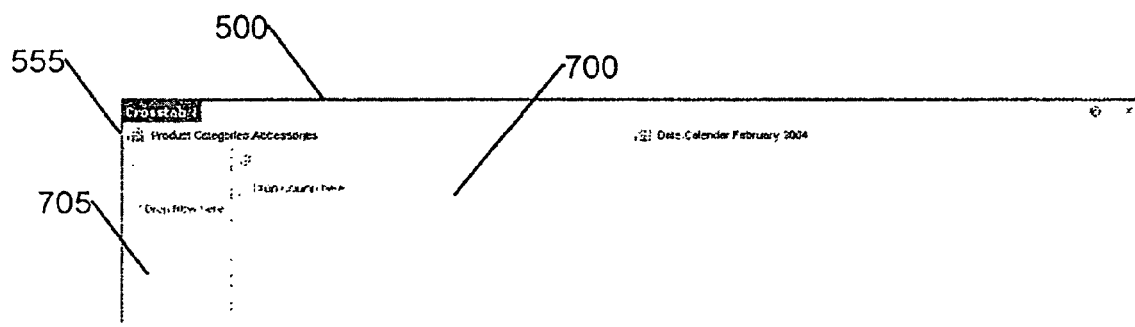
FIG. 7B illustrates a visualization with the slice of FIG. 7A in accordance with an embodiment of the invention.

As a result, crosstab 500 is then filtered to drill down on dimensions associated with cell 600, as shown in FIG. 7B. Dimensions 505-515 are no longer displayed across (700) crosstab 500 and dimensions 520-535 are no longer displayed down (705) crosstab 500.

According to an embodiment of the invention and as described above, the new dimensions are selected based on one of the criteria illustrated in FIG. 3. For example, dimensions list 400 may provide a default order of dimensions for the OLAP cube, and the user may select the new dimensions to be displayed based on this default order (305). The user may also select the new dimensions by dragging and dropping them into crosstab 500 (300), select the dimensions according to a user-selected order (310), or select the dimensions according to a usage-based order (315).

Figure 8A:
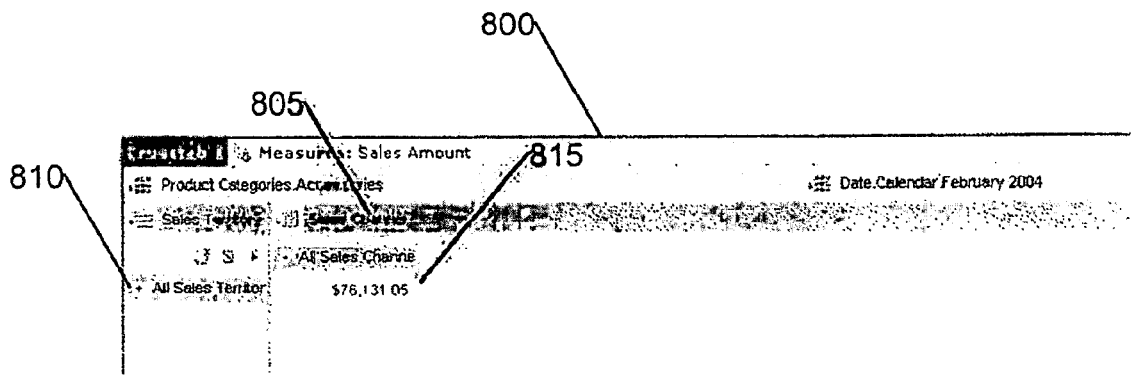
FIG. 8A illustrates a filtered visualization in accordance with an embodiment of the invention.

The new dimensions may be, for example, a Sales Channel dimension and a Sales Territory dimension selected from list 400. A visualization displaying these dimensions together with populated slice 555 is shown in FIG. 8A. FIG. 8A shows Sales Channel dimension 805 displayed across crosstab 800 and Sales Territory dimension 810 displayed down crosstab 800. Accordingly, cell 815 shows the sales amount for all sales territories and all sales channels during the month of February 2004 (510) for the Accessories (520) product line. Dimension members 510 and 520 are associated with cell 600 selected by the user for filtering.

It is appreciated that selecting a cell on a crosstab for further drill down and filtering results in a more detailed view of the data in a multi-dimensional database. For example, selecting cell 600 enables the user to have a more detailed view of the data associated with the dimension members represented in the cell, i.e., the February 2004 (510) and the Accessories (520) dimension members. The value of cell 600 equals the value of the cell 815, that is $76,131.05. Filtering the crosstab based on those dimension members allows the user to analyze further dimensions and their values for the Accessories (520) product line during the month of February 2004 (510).

Figure 8B:
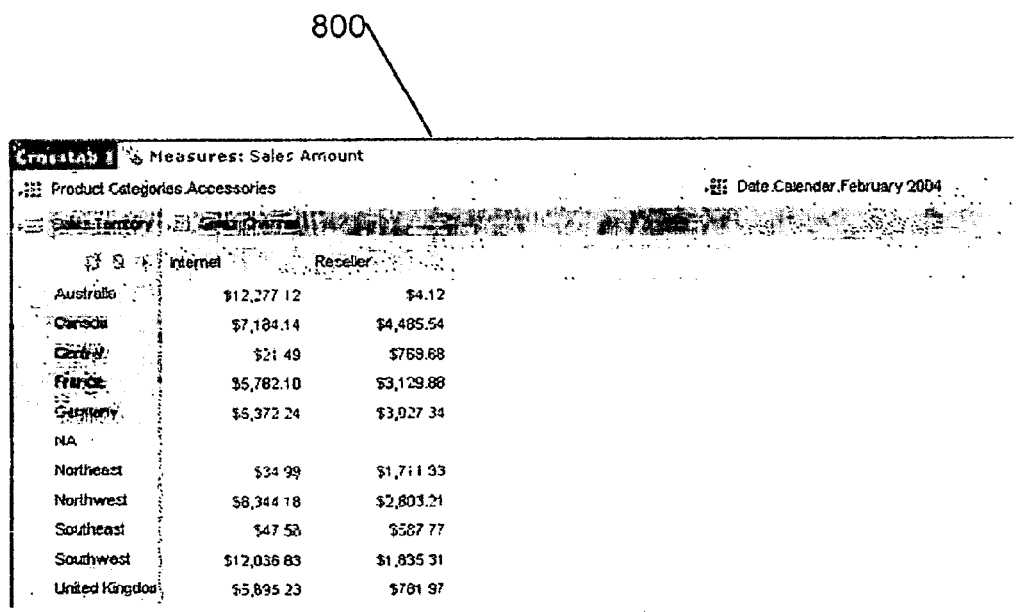
FIG. 8B illustrates the filtered visualization of FIG. 8A with expanded dimensions in accordance with an embodiment of the invention.

Dimensions 805-810 in crosstab 800 can be expanded to display their members, as shown in FIG. 8B. Doing so expands dimension 805 into different sales channels and dimension 810 into different sales territories. The user may then again "Pin & Pivot," selecting another cell for further filtering and drill down. For example, the user may select cell 900 as shown in FIG. 9 to populate slice 905 with dimension members France 910 and Reseller 915. The user may continue to "Pin & Pivot" as many times as desired, or until all dimensions are presented in the slice 555 with the last two dimensions remaining in the crosstab. This allows the user to make a more detailed examination and navigation of data in the OLAP cube.

Advantageously, the present invention enables users of multi-dimensional databases to quickly focus into the data displayed in crosstabs. Doing so enables users to more effectively manage and analyze their data.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:
   provide a graphical user interface for displaying visualizations of a multi-dimensional database, the visualizations comprising a crosstab displaying at least one member of a first dimension across the crosstab and at least one member of a second dimension down the crosstab in a table of cells;
   receive an action within the table;
   filter the crosstab to drill down on the member of the first dimension and the member of the second dimension associated with the cell; and
   display members of a third dimension across the crosstab and members of a fourth dimension down the crosstab in response to the filtering, the members of the third dimension replacing the members of first dimension and the members of the fourth dimension replacing the members of the second dimension, at least one of the plurality of members of the third dimension and the plurality of members of the fourth dimension being arranged in a pre-determined order, the pre-determined order being based on monitored usage of the corresponding dimension members to determine an order of most frequently used dimension members.

2. The computer readable storage medium of claim 1, wherein the executable instructions to receive an action within a visualization of a table comprise executable instructions to highlight a cell of the crosstab comprising a value associated with the first dimension and the second dimension.

3. The computer readable storage medium of claim 2, wherein the value associated with the first dimension and the second dimension comprises a value associated with a member of the first dimension and a member of the second dimension.

4. The computer readable storage medium of claim 1, wherein the executable instructions to receive an action within a visualization of a table comprise executable instructions to display a menu of user choices in response to the user selecting a cell of the crosstab.

5. A non-transitory computer readable storage medium, comprising executable instructions to:
provide a visualization of a multi-dimensional database, the visualization displaying a crosstab having a first dimension across the crosstab and a second dimension down the crosstab; populate a slice in the visualization with a member of the first dimension and a member of the second dimension in response to a user selection of a cell in the crosstab; and
filter the visualization based on the member of the first dimension and the member of the second dimension to result in a plurality of members of a third dimension being displayed across the crosstab and a plurality of members being displayed down the crosstab, at least one of the plurality of members of the third dimension and the plurality of members of the fourth dimension being arranged in a pre-determined order, the pre-determined order being based on monitored usage of the corresponding dimension members to determine an order of most frequently used dimension members.

6. The computer readable storage medium of claim 5, wherein the executable instructions to populate a slice in the visualization comprise executable instructions to highlight the cell of the crosstab selected by the user, the cell comprising a value associated with a member of the first dimension and a member of the second dimension.

7. The computer readable storage medium of claim 6, wherein the executable instructions to populate a slice in the visualization comprise executable instructions to display a menu of user choices in response to the user selection.

8. The computer readable storage medium of claim 6, wherein the executable instructions to populate a slice in the visualization comprise executable instructions to populate a slice in the visualization with the member of the first dimension and the member of the second dimension.

9. A method for navigating through a multi-dimensional database, comprising:
providing a visualization of a multi-dimensional database, the visualization displaying a crosstab having a first dimension across the crosstab and a second dimension down the crosstab;
receiving user-generated input via a graphical user interface selecting a member of the first dimension and a member of the second dimension, the member of the first dimension and the member of the second dimension represented in a cell of the crosstab selected by a user;
updating the crosstab to display drilled down dimensions associated with the member of the first dimension and the member of the second dimension, the updating comprising:
receiving a selection of a third dimension and a fourth dimension by the user, the third and fourth dimensions having values associated with the member of the first dimension and the member of the second dimension;
displaying a plurality of members of the third dimension across the crosstab; and
displaying a plurality of members of the fourth dimension down the crosstab;
wherein at least one of the plurality of members of the third dimension and the plurality of members of the fourth dimension being arranged in a pre-determined order, the pre-determined order being based on monitored usage of the corresponding dimension members to determine an order of most frequently used dimension members.

10. The method of claim 9, further comprising populating a slice in the visualization to display the member of the first dimension and the member of the second dimension.

11. The method of claim 9, further comprising highlighting the cell of the crosstab selected by the user and displaying a menu of user choices in response to the user selection.

* * * * *